United States Patent [19]

Hargreaves et al.

[11] Patent Number: 4,642,130
[45] Date of Patent: Feb. 10, 1987

[54] APPARATUS FOR AND METHOD OF COATING GLASS

[75] Inventors: Edward Hargreaves, Prescot; Andrew F. Simpson, Preston, both of England

[73] Assignee: Pilkington Brothers P.L.C., St. Helens, England

[21] Appl. No.: 716,093

[22] Filed: Mar. 26, 1985

[30] Foreign Application Priority Data

Mar. 29, 1984 [GB] United Kingdom ............... 8408118

[51] Int. Cl.⁴ ............................................ C03C 17/00
[52] U.S. Cl. ................................. 65/60.1; 65/60.7; 65/60.8; 65/181; 118/326; 427/422
[58] Field of Search ............ 65/60.1, 60.7, 60.8, 65/181, 114; 118/326; 427/422

[56] References Cited

U.S. PATENT DOCUMENTS

| 1,483,461 | 2/1924 | Littleton, Jr. | 65/114 |
| 3,223,549 | 12/1965 | Fredley et al. | 65/60.8 |
| 3,887,349 | 6/1975 | Akashi et al. | 65/181 |
| 3,888,649 | 6/1975 | Simhan | 65/60.7 |

FOREIGN PATENT DOCUMENTS 0095765 5/1983 European Pat. Off.
WO83/01945 6/1983 Int'l Pat. Institute.

Primary Examiner—Arthur Kellogg
Attorney, Agent, or Firm—Burns, Doane, Swecker & Mathis

[57] ABSTRACT

Apparatus for coating glass by pyrolysis of a powder at the glass surface to form a coating on that surface, and in which a flow of a suspension of a powder in a carrier gas is applied to a moving hot glass surface across the width of that surface, comprising means for supporting and advancing hot glass beneath an applicator comprising a chamber terminating in a slot extending across the supporting means close to the path of the glass surface to be coated, which chamber diverges downwardly from a central inlet for the downward flow of the suspension of the powder.

10 Claims, 3 Drawing Figures

APPARATUS FOR AND METHOD OF COATING GLASS

FIELD OF THE INVENTION

This invention relates to coating glass and in particular to an apparatus and method for coating glass by pyrolysis of a powder at a hot glass surface to form a coating on that surface.

DESCRIPTION OF THE PRIOR ART

It has been proposed to produce a low emissivity coating on a glass surface by pyrolysis at that surface of a tin compound in the presence of a halogen, usually fluorine, to produce a fluorine-containing tin oxide coating of appropriate thickness for example 100 nm to 1000 nm. Such coatings are known to reflect infra-red radiation, that is have a low emissivity, while transmitting light in the visible part of the spectrum. This property is useful in that infra-red energy generated inside a building is reflected back into the building, and glass having this property is advantageous for architectural glazing.

It is known from European Patent Publication No. 0 039 256 A1 to introduce into a gas flow a mixture of powdered dibutyl tin oxide and dibutyl tin difluoride with particle size less than 20 $\mu$m and to eject the suspension of that mixed powder in the gas towards a hot moving glass surface through a slotted nozzle placed horizontally above the surface of the glass to be coated. The suspension of powder leaving the nozzle pyrolyses on the hot glass surface and forms on that surface a fluorine-containing tin oxide coating.

European Patent Publication No. EP 0 006 064 A1 also relates to the distribution of such a powder towards a hot glass surface for pyrolysis to produce a coating on the glass. In this proposal a powder suspension is fed through a venturi into a chamber prior to being distributed downwardly to a slit above the glass surface. During its downward passage auxiliary gases are introduced in an attempt to obtain homogeneity of the powder suspension which exits through the slit.

It has also been proposed, for example in GB No. 2 081 136 A to mix a powder coating reactant with air from an air supply and to pass the mixture into a coating chamber through baffles which create turbulence which is said to maintain uniform distribution of the powder coating reactant in the carrier gas as it is delivered towards the substrate to be coated.

SUMMARY OF THE INVENTION

It is a main object of the present invention to provide an apparatus and method for coating glass by pyrolysis of a powder at the glass surface which have the merits of simplicity and reliability and do not rely on the use of narrow or convoluted orifices which are prone to blockage.

According to the invention there is provided apparatus for coating glass by pyrolysis of a powder at the glass surface to form a coating on that surface, and in which a flow of a suspension of a powder in a carrier gas is applied to a moving hot glass surface across the width of that surface comprising means for supporting and advancing hot glass beneath an applicator comprising a chamber terminating in a slot extending across the supporting means close to the path of the glass surface to be coated, characterised in that the chamber diverges downwardly from a central inlet for the downward flow of the suspension of the powder.

In a preferred embodiment the chamber is defined between inverted fan-shaped front and rear walls which are joined by sloping end walls.

In a preferred arrangement, the apparatus further includes spreading means to regulate the uniformity of distribution of powder into the downwardly diverging flow in the chamber. Preferably, the spreading means are mounted in the chamber at the inlet.

In a preferred embodiment a downwardly directed supply pipe for the powder suspension is connected to the central inlet, baffles are mounted in the inlet, which baffles lie in the direction of the downward flow and have lower portions splayed outwardly in the chamber towards the sides of the chamber.

Preferably the baffles are adjustably mounted in the inlet. The baffles may extend over from 5% to 20% of the length of the flow path through the chamber from the inlet to the slot.

In an alternative arrangement, instead of using spreading means which lie in the direction of the downward flow of the suspenion of powder, the spreading means may be positioned transversely to the direction of the said flow; such spreading means may be mounted at the inlet of the chamber.

Preferably the slot is a parallel sided slot leading downwardly from the chamber to the path of the glass surface.

The invention also includes a method of coating glass by pyrolysis of a powder at the glass surface to form a coating on that surface, which method comprises providing a downward flow of a suspension of a powder in a carrier gas, and using the apparatus of the invention to create a controlled downward divergence of the flow of powder in the carrier gas to the required width for application to the glass surface while maintaining uniformity of deposition of the coating on the moving glass surface from the diverging flow.

Preferably the diverging flow is fan-shaped and flow of powder in said suspension is deflected outwardly towards the sides of the fan-shaped flow.

In a preferred method when producing a low emissivity fluorine-containing tin oxide coating on glass, the powder is a tin compound which on pyrolysis produces that coating on the glass surface.

The invention also includes glass having a coating produced by the method of the invention.

BRIEF DESCRIPTION OF THE DRAWINGS

In order that the invention may be more clearly understood an embodiment thereof will now be described, by way of example, with reference to the accompanying drawings, in which.

DESCRIPTION OF PREFERRED EMBODIMENTS

Figure 1:
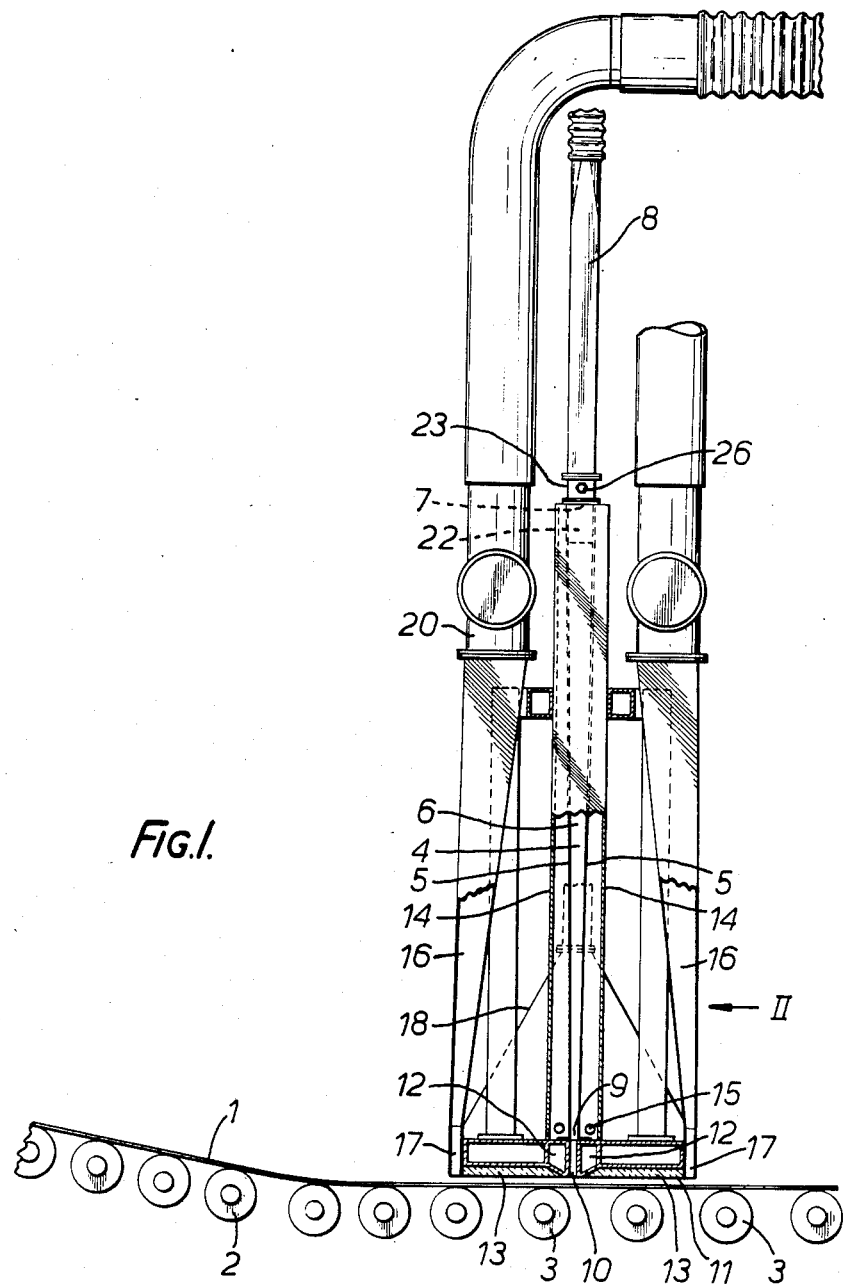
FIG. 1 is a schematic side elevation of apparatus according to the invention for coating the upper surface of a hot ribbon of glass as it is advanced from a forming process.

Referring to the drawings a hot ribbon of glass 1 is supported on rollers 2 as it leaves a rolling machine. The ribbon of glass advances on horizontal rollers 3 beneath an applicator for applying a coating to the glass and the horizontally advancing ribbon is at a temperature in the range 400° C. to 750° C. as it passes beneath the applicator.

The applicator comprises an upright chamber 4 defined between flat, fan-shaped front and rear walls 5 which are joined by sloping end walls 6. At its upper end the chamber is shaped as a square-section inlet 7 which is connected to a downwardly directed supply pipe 8, which, in this embodiment, is also of square section, and which carries downwardly towards the chamber a downward flow of a suspension in air as carrier gas of a powder whose pyrolysis at the glass surface is to form a coating on that surface.

For example for the production of a low emissivity fluorine-containing tin oxide coating on the upper surface of the hot ribbon of glass 1 the powder may be dibutyl tin difluoride which powder is fed from a powder hopper by means of a screw feed in conventional manner into a duct where the powder feed is entrained in a regulated flow of air. The suspension of powder is fed through gently curving pipes to the top of the duct 8 and then flows downwardly through that duct for example at a speed of 20 m/s at a rate of supply of 170 m$^3$/h with an air pressure of about 200 kPa.

Figure 2:
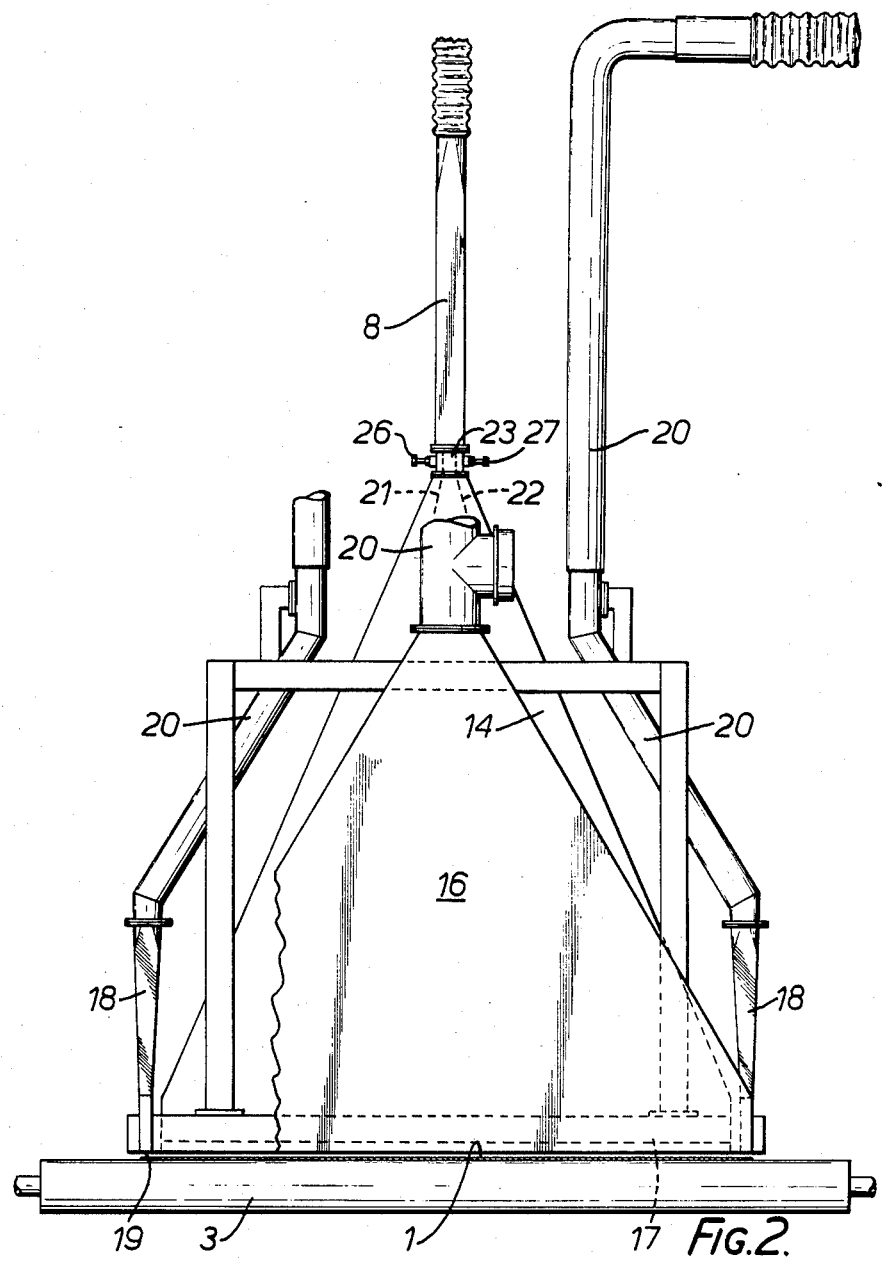
FIG. 2 is a front elevation, partly cut away, in the direction of arrow II on FIG. 1.

The chamber 4 between the walls 5 and 6 diverges downwardly from the central inlet 7 and has the general shape of an inverted fan as shown in FIG. 2. The fan-shaped front and rear walls 5 taper downwardly towards each other so that the chamber 4 terminates at a narrow slot shaped exit 9 from the chamber which exit communicates with a parallel-sided slot 10 which leads downwardly from the chamber 4 to the foot 11 of the applicator, which foot is spaced just above the path of travel of the upper surface of the ribbon of glass 1. The two massive members between which the slot 10 is defined have a hollow sectional structure as shown in FIG. 1 including laterally extending cooling chambers 12 through which cooling water flows to cool the faces which define the parallel-sided slot 10. The base of the structure carries laterally extending slabs 13 of mineral fibre insulation board so that the lower surface of the applicator heats up and does not act as a site for the condensation of vapours formed in the deposition process.

The fan-shaped chamber 4 is housed within an outer jacket having fan-shaped walls 14. Apertured pipes 15 are mounted in the space between the walls 5 and 14 at the base of the applicator just above the slot 10. The apertures in the pipes 15 are directed upwardly to blow cooling air flows upwardly over the front and rear walls 5 of the chamber. These air flows escape upwardly. The base of the applicator therefore comprises two laterally extending faces of mineral fibre insulation board between which the slot 10 emerges to direct downwardly towards the hot glass surface the uniform distribution of the powder for pyrolysis to create the required coating on the glass surface by the time the surface emerges from beneath the applicator. Powder flows both upstream and downstream through the treatment space defined between the foot 11 and the upper surface of the ribbon of glass 1.

Excess powder is extracted by means of four fan-shaped extractor ducts. Two extractor ducts 16 are mounted laterally of the applicator respectively upstream and downstream of the chamber 6 and have mouths 17 at the wider extremities of the foot of the applicator, that is extending right across the path of travel of the ribbon of glass. At each side of the applicator there is a similar smaller extractor duct 18, and the ducts 18 have mouths 19 which as shown in FIG. 2 are parallel to the direction of movement of the ribbon of glass and extend alongside the path of travel of the ribbon. These extractor ducts 16 and 18 are connected to extraction manifolds 20 which carry away products of the reaction of the air-borne powder from the surface of the hot glass ribbon.

In order to maintain uniformity of deposition of the coating on the surface of the ribbon 1 right across the width of that surface the fantail shape of the chamber 4 creates a controlled divergence of the downward flow of the suspension of powder which enters the chamber through the inlet 7 from the duct 8. The uniformity of distribution of the powder into the diverging flow down through the chamber 4 is regulated by spreading means mounted in the chamber 4 at the inlet 7. This spreading means takes the form of baffles 21 and 22 illustrated in FIG. 3.

Figure 3:
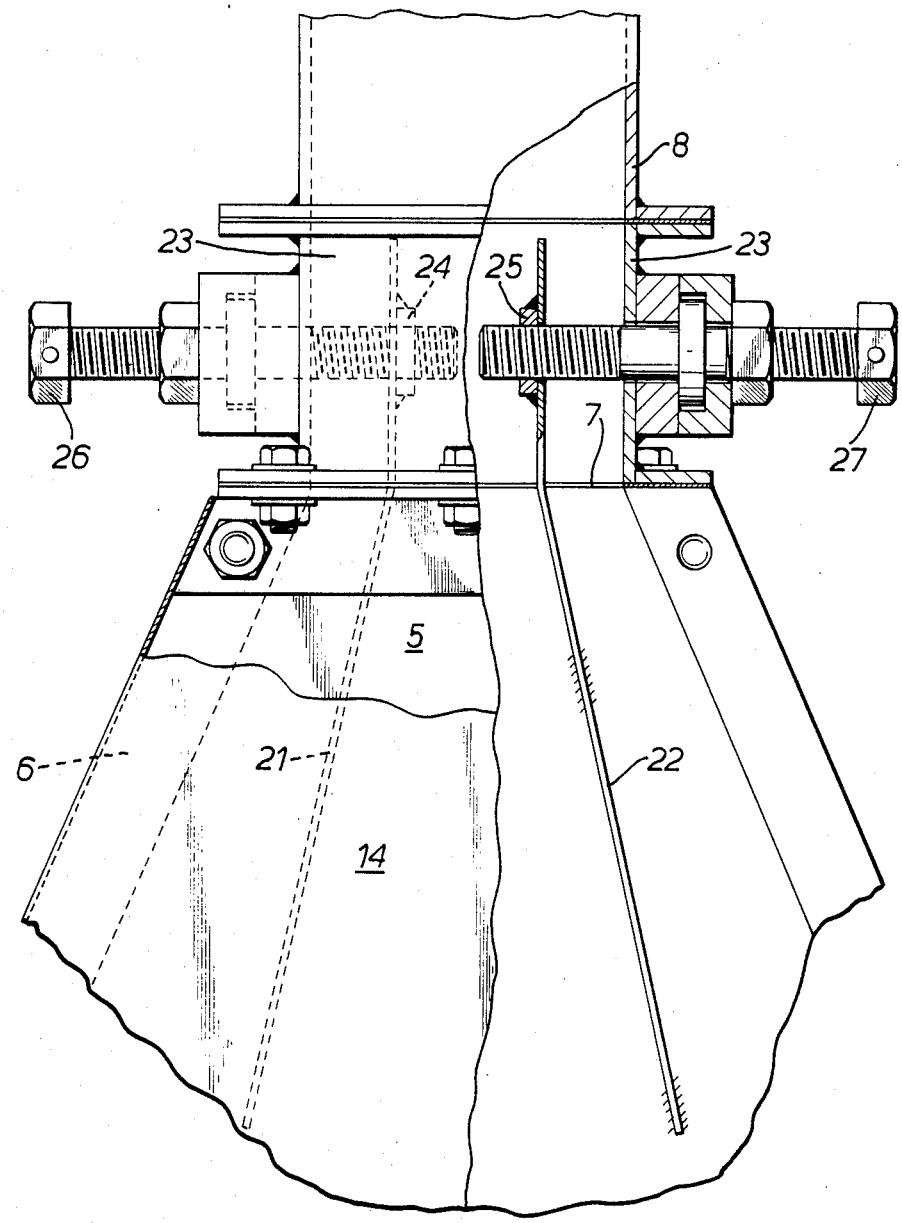
FIG. 3 is a detailed view of part of the apparatus of FIGS. 1 and 2.

Each of the baffles 21, 22 is in the form of a shaped rectangular plate whose narrower dimension is such that it just fits within the upper part of the chamber 4 where the chamber 4 is beginning to diverge below the inlet 7. The end walls 6 of the chamber 4 diverge downwardly from the square sectioned inlet 7 which is coupled to the pipe 8 by a coupling 23 of square section. Each of the baffles 21 and 22 has an end portion formed with a central hole to which nuts 24 and 25 are welded. As shown in FIG. 3 the baffles are held in the coupling 23 by bolts 26 and 27 which pass through the coupling 23 and are threaded into the nuts 24 and 25 of the baffles respectively.

The baffles 21 and 22 are shaped so that their lower portions are splayed outwardly in the chamber 4. The angles of the baffles lie at the position of the inlet 7 and the baffles are splayed symmetrically and are tack-welded to one of the walls 5 of the chamber. Preferably the baffles 21, 22 extend over not more than 40% of the length of the flow path through the chamber 4 from the inlet 7. Usually the baffles 21, 22 extend over from 5% to 20% of the length of those flow paths, and in the illustrated embodiment they extend over approximately 10% of the length of the flow paths through the chamber from the inlet 7 to the slot 10.

By adjustment of the positions of the upper parts of the baffles in the inlet 7, by means of the bolts 26 and 27 it is possible to divert powder towards the end walls 6 of the chamber 4. This spreading means mounted at the inlet to the chamber thus regulates the uniformity of distribution of the powder into the diverging flow in the chamber 4 and in particular ensures no starvation of the flow of powder in the gas which reaches the marginal parts of the ribbon of glass through the slot 10.

Two baffles as illustrated have been found to produce a great improvement in the uniformity of deposition of the coating on the moving glass surface. More than two such baffles may be provided and instead of mounting the baffles on bolts and tack-welding the baffles to the walls 5 of the chamber, a number of baffles, for example four may be mounted on hinges located across the inlet 7, with means for adjusting the angular position of those baffles in the chamber relative to the required distribution of divergence of powder into the gas flow downwardly through the slot 10 to the glass surface.

The method of the invention can also be used for producing solar control coatings on glass, for example coatings containing oxides of iron, cobalt and nickel.

We claim:

1. Apparatus for coating glass by pyrolysis of a powder at the glass surface to form a coating on that surface, and in which a flow of a suspension of a powder in a carrier gas is applied to a moving hot glass surface across the width of that surface, said apparatus comprising:
    an applicator for applying said suspension of powder in a carrier gas to said glass surface;
    means for supporting and advancing hot glass along a path beneath said applicator;
    the applicator comprising a chamber which, transversely of said path, diverges downwardly from a central inlet for the downward flow of said suspension of powder, the chamber being defined between inverted fan-shaped front and rear walls which are joined by sloping end walls, and the diverging, inverted fan-shaped chamber terminating in a slot extending across said supporting means close to the path of the glass to be coated.

2. Apparatus according to claim 1, further including spreading means, mounted in said chamber at said inlet, to regulate the uniformity of distribution of powder into the downwardly diverging flow in said chamber.

3. Apparatus according to claim 1, wherein a downwardly directed supply pipe for said powder suspension is connected to said central inlet, and baffles are mounted at said inlet, said baffles lying in the direction of downward flow, and lower portions of said baffles being splayed outwardly in said chamber towards the sides of said chamber.

4. Apparatus according to claim 3, wherein said baffles are adjustably mounted in said inlet.

5. Apparatus according to claim 3, wherein the baffles extend over for 5% to 20% of the length of the flow paths through the chamber from said inlet to said slot.

6. Apparatus according to claim 1, wherein said slot is a parallel-sided slot leading downwardly from said chamber to the path of the glass surface.

7. Apparatus according to claim 1 wherein said inverted fan-shaped front and rear walls taper downwardly towards each other.

8. A method of coating glass by pyrolysis of a powder at the glass surface to form a coating on that surface, comprising:
    providing a downward flow of a suspension of said powder in a carrier gas,
    creating a controlled fan-shaped divergence of said flow to a width corresponding to the width of a moving hot glass surface to be coated, the divergence being created transversely of the path of movement of the hot glass surface and downwardly from a central inlet for the downward flow of said suspension of powder, in a chamber defined between inverted fan-shaped front and rear walls which are joined by sloping end walls, and
    applying said flow at that width to the glass surface, while maintaining uniformity of deposition of the coating on the moving glass surface from said diverging flow.

9. A method according to claim 8, wherein the flow of powder in said suspension is deflected outwardly towards the sides of said chamber.

10. A method according to claim 8, wherein said powder is a tin compound which on pyrolysis produces a low emissivity fluorine-containing tin oxide coating on said glass surface.

* * * * *